(No Model.)
T. F. EMANS.
HARROW.
No. 507,894. Patented Oct. 31, 1893.
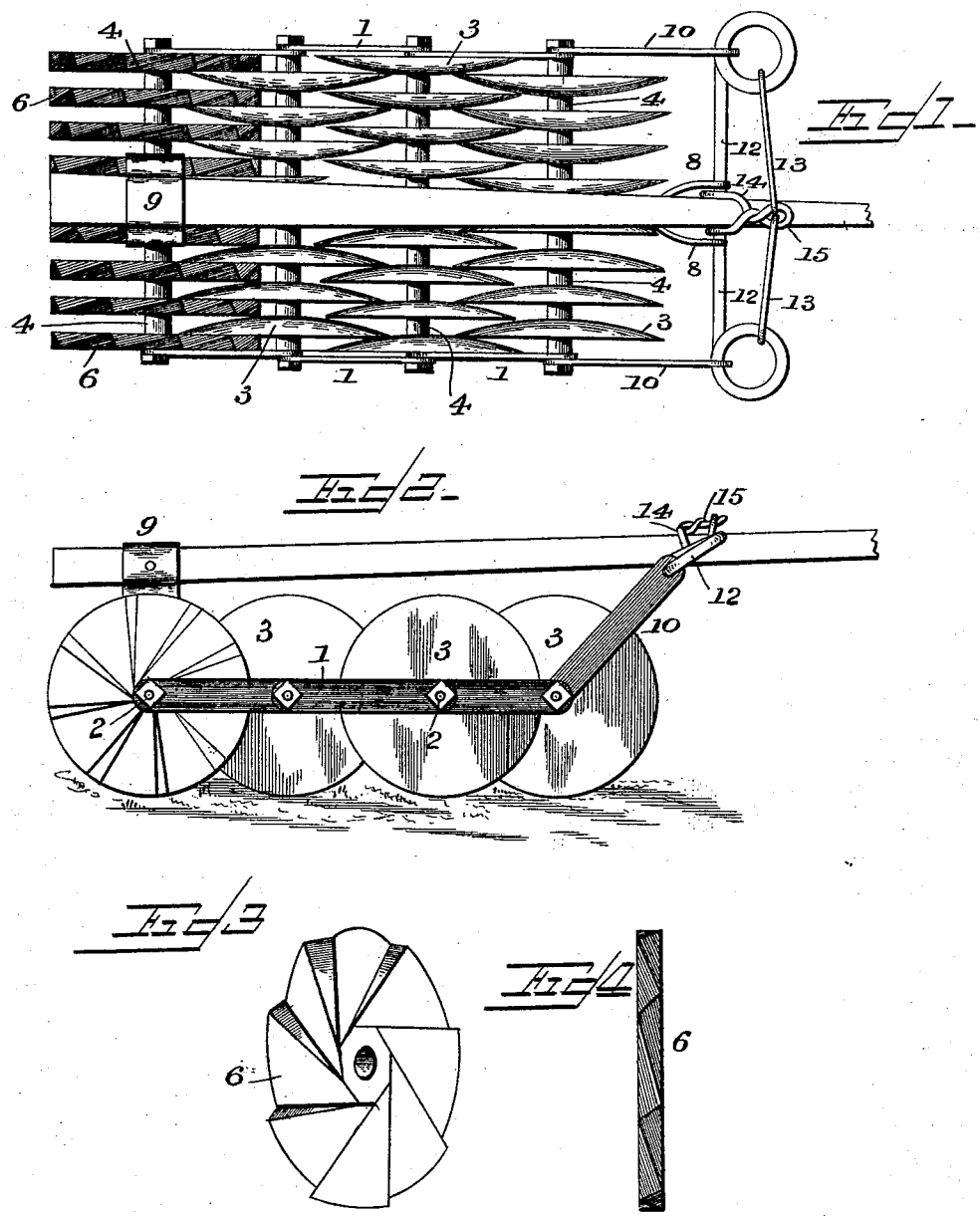

UNITED STATES PATENT OFFICE.

THEODORE F. EMANS, OF MENDON, OHIO.

HARROW.

SPECIFICATION forming part of Letters Patent No. 507,894, dated October 31, 1893.

Application filed December 17, 1892. Serial No. 455,516. (No model.)

*To all whom it may concern:*

Be it known that I, THEODORE F. EMANS, a citizen of the United States, and a resident of Mendon, in the county of Mercer and State of Ohio, have invented certain new and useful Improvements in Harrows; and I do hereby declare that the following is a full, clear, and exact description of the invention, which will enable others skilled in the art to which it appertains to make and use the same, reference being had to the accompanying drawings, which form a part of this specification.

My invention relates to improvements in harrows of that class known as disk harrows, in which a number of rotatable disks or cutters are mounted upon a series of shafts or axles pivotally connected together by means of side bars so as to allow the axles and disks to rise and fall when traveling over uneven ground.

The object of the invention is to provide a harrow of the above character with a series of rotatable hoes or soil turners which loosen, lift and turn or scatter the earth after being pulverized, thus aiding in preparing the ground for cultivation.

The invention consists in the novel construction and combination of parts hereinafter fully described and claimed.

In the accompanying drawings: Figure 1 is a plan view of a harrow constructed in accordance with my invention. Fig. 2 is a side elevation of the same. Fig. 3 is a perspective view of one of the hoes or soil turners. Fig. 4 is an edge view of the same.

In the said drawings the reference numeral 1 denotes a series of side bars having their ends pivoted together. Mounted in these side bars are axles or shafts 2, on which are mounted rotatable disks or cutters 3, separated from each other by removable washers or spacing rings 4. These cutters are arranged to travel in different parallel planes so as not to be in line with each other, thus insuring thorough pulverizing of the soil. In rear of the cutters is a shaft or axle, similar to the axle 2, and carrying a series of rotatable hoes or soil turners 6. These hoes consist of waved wheels or disks having their faces formed with alternate prominences and depressions, so that as they rotate they will lift and turn the soil.

The numeral 7 designates the tongue connected respectively with the front and rear axles or shafts, by means of arms 8 and a bail 9, and side bars 10 may also be provided, with which a transverse bar 12 is connected, having its ends supported by arms 13, connected with a clamp 14, consisting of a wire having its ends bent around said shaft and twisted around the tongue and formed into a loop 15, with which the arms 13 are connected. The tongue, however, can be dispensed with if desired, and the harrow used as a drag harrow.

In practice the hoes follow along in rear of the cutters or pulverizers and lift and turn the sod which will be found of great advantage in preparing the soil and also for covering the seed.

Having thus described my invention, what I claim is—

In a disk harrow the combination with the pivoted side bars, the axles or shafts, carrying the rotatable cutters, of the axle or shaft carrying the rotatable hoes consisting of waved wheels, having their faces formed with alternate depressions and prominences, substantially as described.

In testimony that I claim the foregoing as my own I have hereunto affixed my signature in presence of two witnesses.

THEODORE F. EMANS.

Witnesses:
C. E. BEATY,
R. M. HARTER.